United States Patent [19]

Fenner

[11] Patent Number: 4,860,973

[45] Date of Patent: Aug. 29, 1989

[54] CARGO CONVEYING SYSTEM

[75] Inventor: James A. Fenner, Renton, Wash.

[73] Assignee: The Boeing Company, Seattle, Wash.

[21] Appl. No.: 186,929

[22] Filed: Apr. 27, 1988

[51] Int. Cl.$^4$ .......................... B64D 9/00; B64C 1/22
[52] U.S. Cl. .................................. 244/137.1; 414/505;
    414/532; 244/118.1; 198/597; 198/592;
    198/463.3
[58] Field of Search ............................... 414/531–535,
    414/346, 353, 505; 198/597, 598, 457, 782, 592,
    463.3; 193/35 SS; 244/137.1, 118.1

[56] References Cited

U.S. PATENT DOCUMENTS

| | | | |
|---|---|---|---|
| 2,681,130 | 6/1954 | Atwood | 198/463 |
| 2,981,399 | 2/1958 | Parker | 198/31 |
| 3,263,832 | 8/1966 | Williams et al. | 244/137.1 X |
| 3,275,135 | 12/1963 | Niese | 209/74 |
| 3,348,678 | 1/1966 | Flowers | 209/74 |
| 3,489,300 | 1/1970 | McCartney et al. | 414/353 X |
| 3,534,872 | 6/1970 | Roth et al. | 214/8.5 |
| 3,548,756 | 12/1970 | Fujioka | 105/455 |
| 4,047,625 | 9/1977 | Grant | 214/95 |
| 4,050,655 | 9/1977 | Bogue et al. | 244/137 |
| 4,130,193 | 12/1978 | Bourgeois | 198/369 |
| 4,218,034 | 8/1980 | Magill | 244/114 |
| 4,541,768 | 9/1985 | Walker et al. | 414/535 |
| 4,544,319 | 10/1985 | Folling et al. | 414/505 |
| 4,598,814 | 7/1986 | Felder | 198/369 |
| 4,780,043 | 10/1988 | Fenner et al. | 198/457 |

FOREIGN PATENT DOCUMENTS

| | | | |
|---|---|---|---|
| 230059 | 7/1987 | European Pat. Off. | 414/535 |
| 2190731 | 11/1987 | United Kingdom | 244/137.1 |

Primary Examiner—Joseph F. Peters, Jr.
Assistant Examiner—Gregory R. Poindexter
Attorney, Agent, or Firm—Christensen, O'Connor, Johnson & Kindness

[57] ABSTRACT

A cargo conveyor system (10) having a receiving platform (20) for receiving cargo containers (138) conveyed through a loading door (16) in an aircraft fuselage (14), and movable between a lower inclined position and a vertically raised, horizontally level position; a first roller platform (22) positioned at an upper horizontal level that is substantially coplanar with the vertically raised, horizontally level position, the first roller platform being adapted for lateral movement in the cargo hold (12) between a first position and a second position; and a second roller platform (24) vertically movable between an intermediate horizontal level position vertically below the first roller platform (22) and the upper horizontal level when the first roller platform (22) is in the second position. A lug (130) is contacted by the first roller platform (22) during lateral movement and moves a rod (128) to raise the second roller platform (24) to the upper horizontal level.

11 Claims, 6 Drawing Sheets

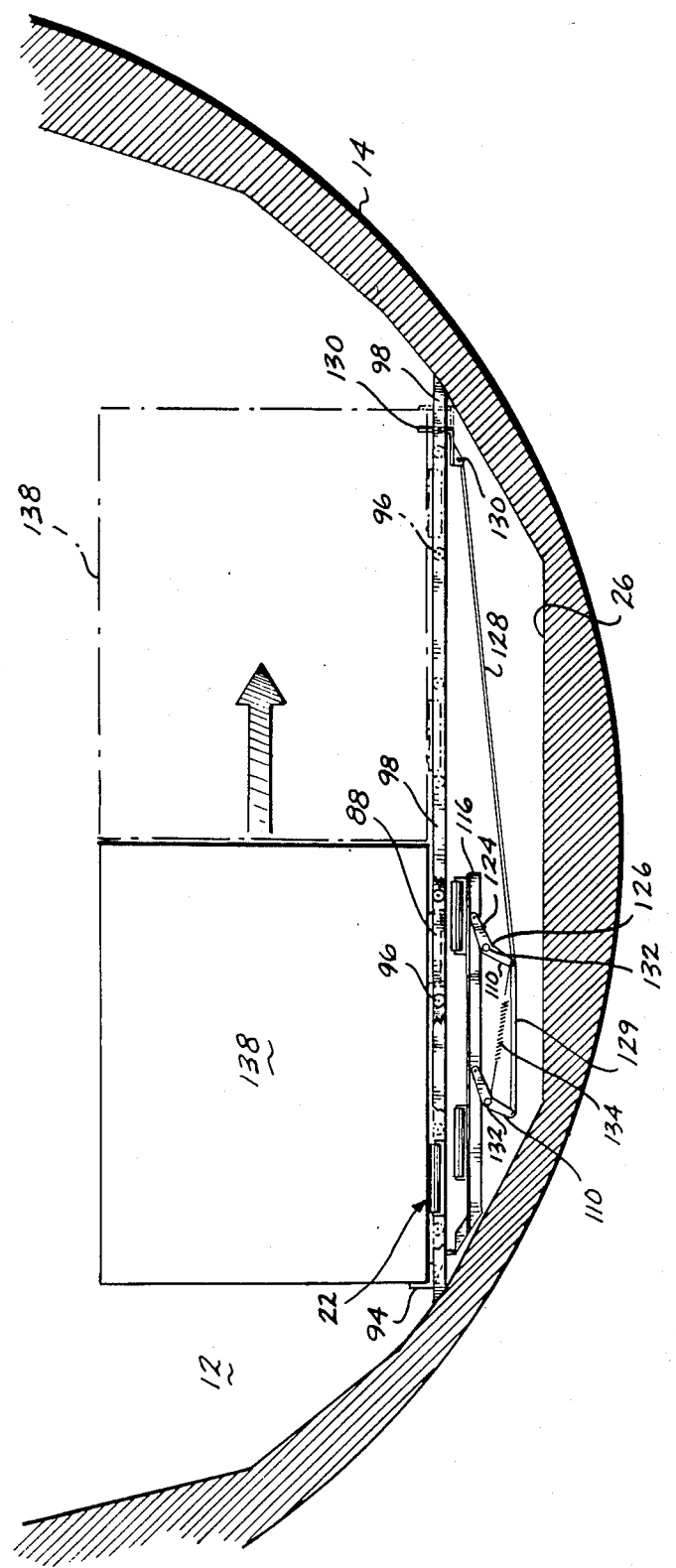

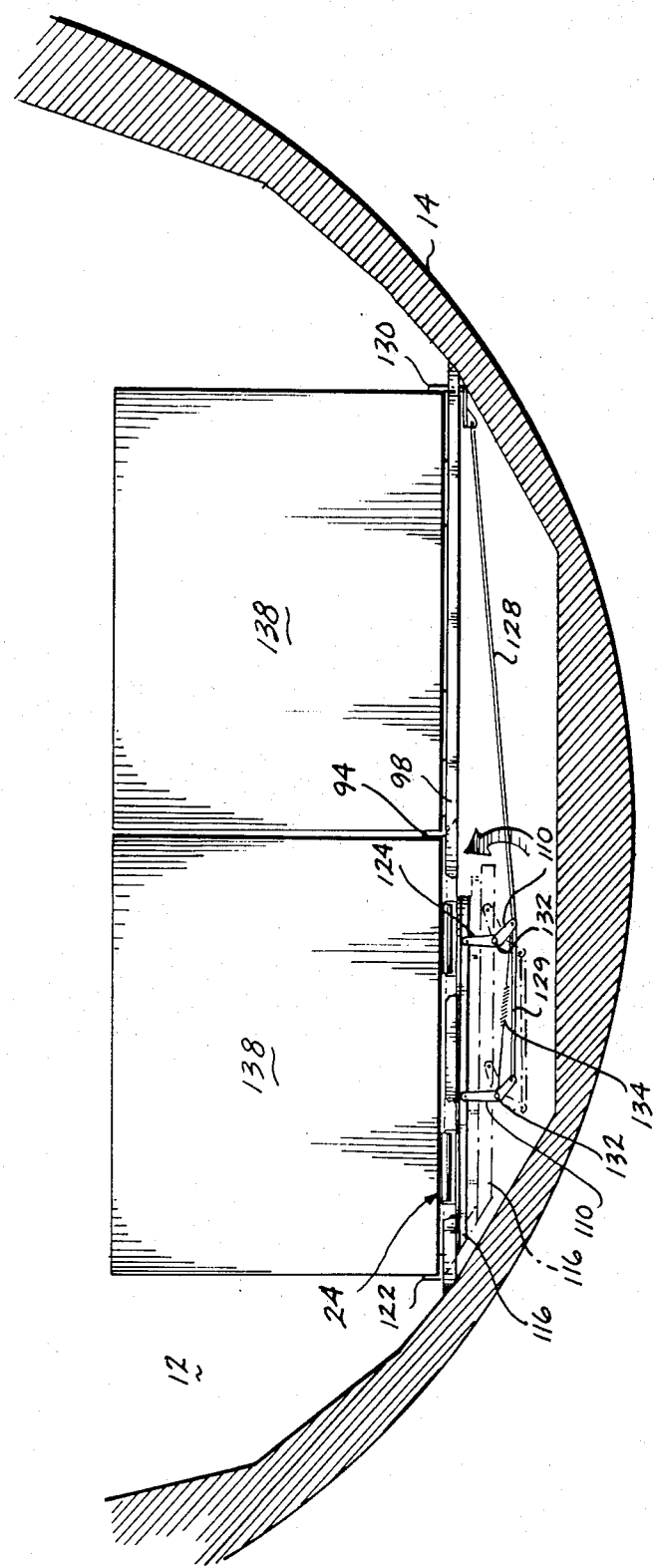

CARGO CONVEYING SYSTEM

TECHNICAL FIELD

The present invention relates to devices for loading and unloading cargo, and, more particularly, to a cargo conveyor system for loading and unloading cargo at multiple levels in the cargo hold of an aircraft fuselage.

BACKGROUND OF THE INVENTION

The lower lobe cargo compartments of standard-sized aircraft are typically loaded through doors located in the side of the aircraft's fuselage below the deck of the upper (e.g., passenger) compartment. Because aircraft fuselages have a generally circular cross-sectional shape, the floor of the lower lobe compartment is relatively narrow. This is illustrated in FIGS. 1A and 1B, which depict the lower lobe compartment 7 in an aircraft fuselage 8. The floor 9 has a relatively narrow width as compared to the width at the top of the compartment 7. Consequently, it can be seen that two containers having a width substantially the same as the width of floor 9 can be stored side by side in the compartment 7 if raised and supported at a higher horizontal level in the compartment 7.

One difficulty that is encountered in storing containers at a horizontal level higher than the floor is the task of raising the containers to the higher level. Although manual labor can be used, it is not suitable in modern day aircraft because of the large size and weight of cargo containers. Another drawback to storing containers at a higher horizontal level is the height restriction on packages or containers that can be loaded into cargo compartments having inward and upward opening doors. In aircraft fuselages using such doors, it is necessary to move a cargo container away from the area of the door prior to raising or lowering the container.

Consequently, there is a need for a cargo conveying system that is capable of vertically and horizontally moving heavy containers inside an aircraft fuselage to achieve a side-by-side load configuration at multiple levels to better utilize the volume available in the compartment.

SUMMARY OF THE INVENTION

In accordance with the present invention, a cargo conveyor system for loading and unloading cargo between multiple levels in the cargo hold of a aircraft fuselage is provided. The cargo conveyor system includes a first cargo support member laterally movable in the cargo hold between a first position and a second position, a second cargo support member vertically movable between an intermediate horizontal level and an upper horizontal level laterally adjacent the first cargo support member, when the first cargo support member is moved to the second position, and platform means for raising and lowering the cargo between a lower inclined position and a vertically raised, horizontally level position that is substantially coplanar with the upper horizontal level.

In accordance with another aspect of the present invention, the cargo conveying system further includes a linkage means for mechanically raising and lowering the second cargo support member as the first cargo support member is moved to the second position.

In accordance with yet another aspect of the present invention, the second cargo support member is positioned in vertical alignment below the first position of the first cargo support member when the second cargo support member is at the intermediate horizontal level and the first cargo support member is in the first position.

In accordance with still yet another aspect of the present invention, the platform means includes a receiving platform for receiving cargo containers conveyed through a loading door in the aircraft fuselage, raising and lowering means for vertically raising and lowering the receiving platform and longitudinal conveyor means for moving the cargo containers longitudinally in the cargo hold.

As will be readily appreciated from the foregoing description, the present invention provides a cargo conveyor system for loading and unloading cargo at multiple levels in the cargo hold of an aircraft fuselage. This permits storing of the cargo containers in a side-by-side load configuration above the bottom of the fuselage of a plane that better utilizes available space in the cargo hold. In addition, the present invention permits loading of standard size cargo containers through cargo doors that open inwardly and upwardly in the fuselage and the raising and lowering of these cargo containers in the cargo hold when the door is open. Furthermore, the present invention permits loading of cargo at an inclined position into the cargo hold and then raising of the cargo from the inclined position to a raised horizontally level position within the cargo hold. The present invention is compatible with existing aircraft and can be installed without modifying the aircraft doors.

BRIEF DESCRIPTION OF THE DRAWINGS

FIG. 5 is a cross-sectional view of the cargo conveying system taken along lines 5—5 showing the first cargo support platform in the first position and the second cargo support platform at the intermediate horizontal level; and FIG. 6 is a cross sectional view of the cargo conveying system of FIG. 5 showing the first cargo support platform laterally moved to a second position and the second cargo support platform raised to the upper horizontal level.

DETAILED DESCRIPTION OF THE PREFERRED EMBODIMENT

Figure 1A:
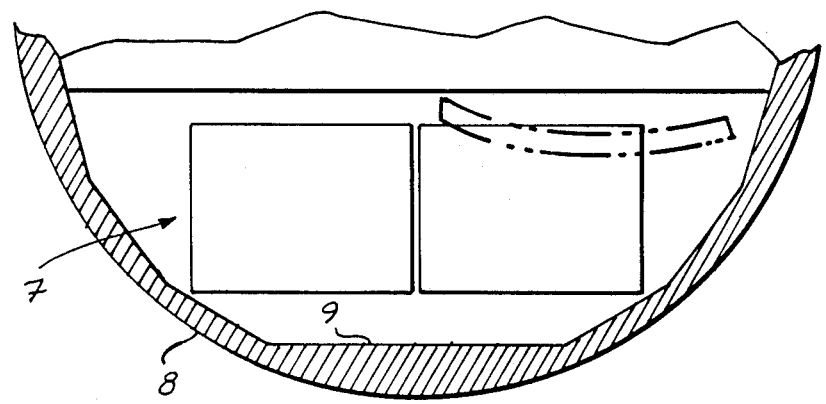
FIGS. 1A and 1B are pictorial diagrams of a standard-body aircraft depicting the loaded configuration of a lower lobe cargo compartment.
Figure 1B:
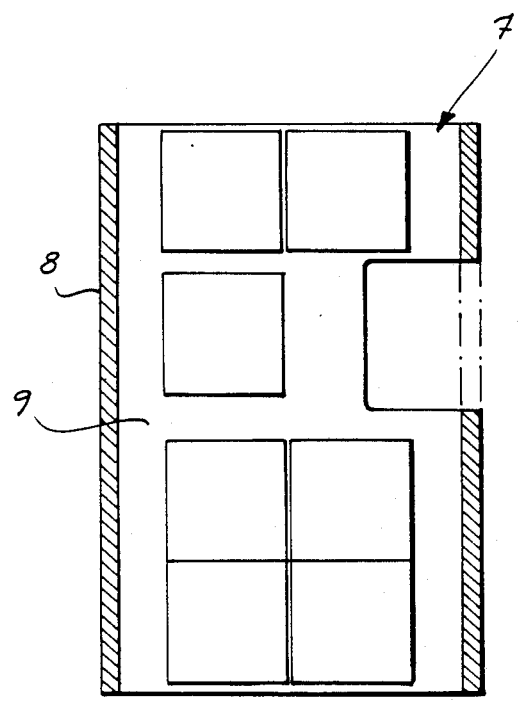
Figure 2:
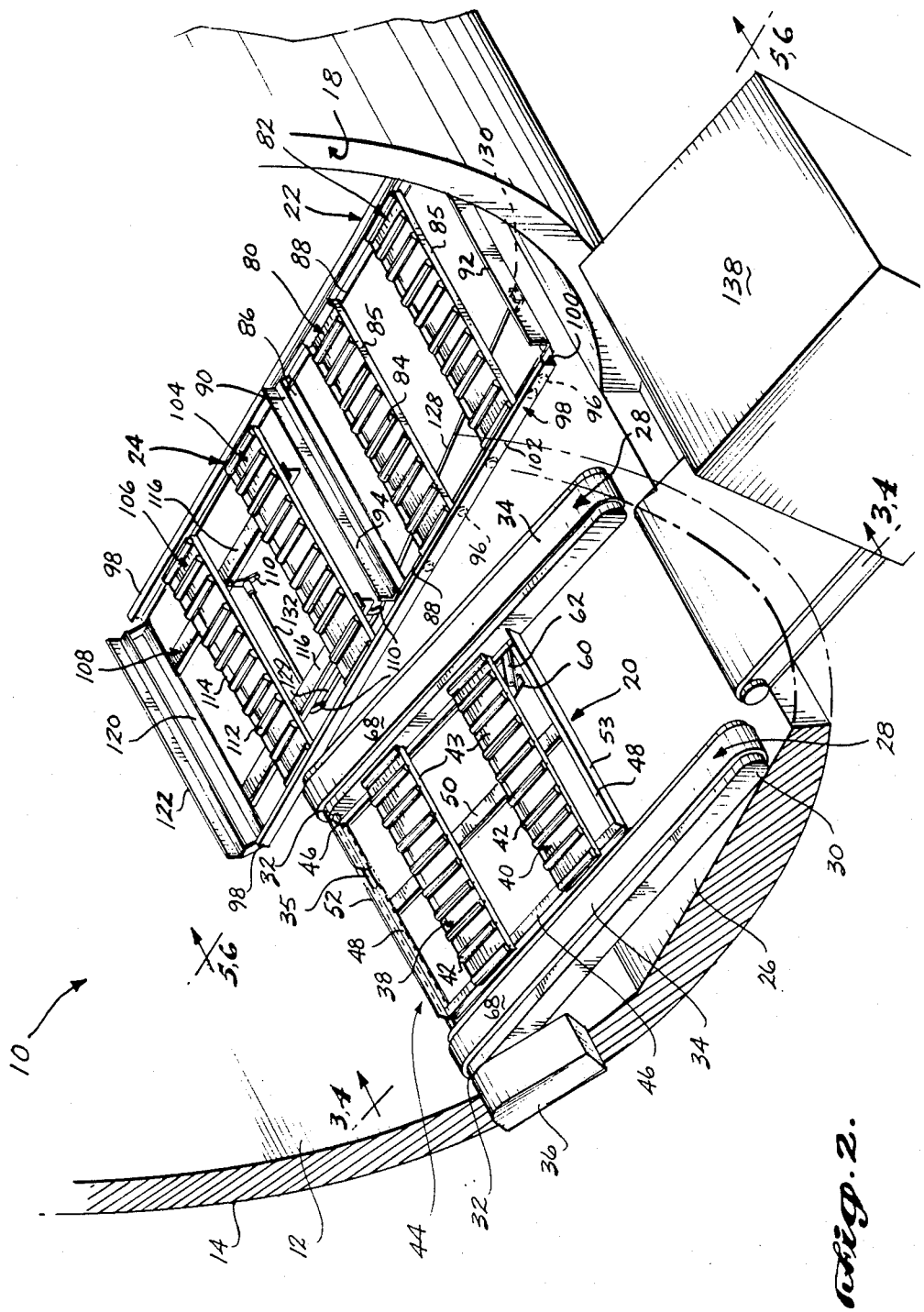
FIG. 2 is an isometric view of the cargo conveying system formed in accordance with the present invention.

Referring initially to FIG. 2, a cargo conveyor system 10 is shown mounted in the lower lobe cargo hold 12 of an aircraft fuselage 14. A loading door 16 (shown in FIG. 3) is mounted in the doorway 18 along its upper edge to open inwardly and upwardly in the cargo hold 12. While the present invention was developed for use in moving cargo containers into and out of the lower lobe cargo hold of an aircraft, and is described in this environment, it is to be understood that the invention can be used in other environments where it is necessary to load and unload cargo between two or more levels, particularly environments where such a load configuration is needed to maximize the use of available storage space.

Figure 4:
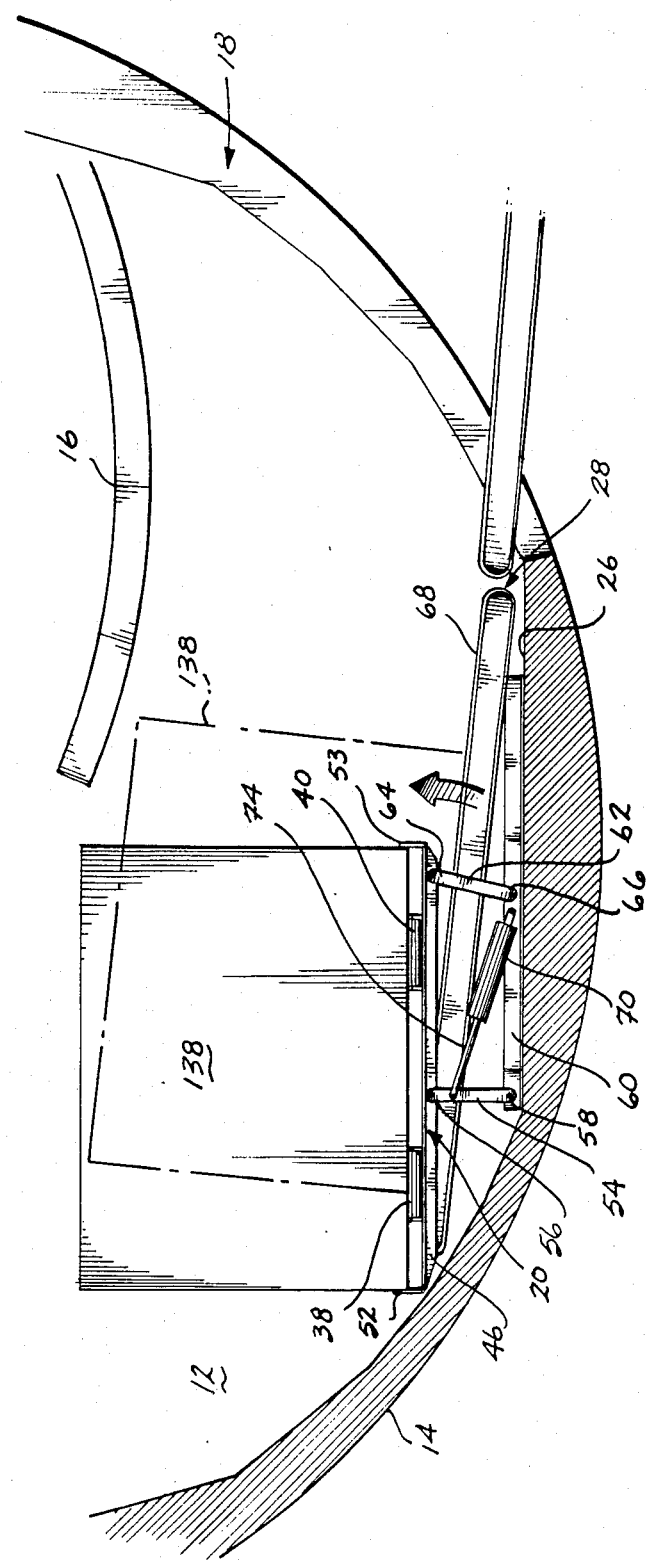
FIG. 4 is a cross section view of the receiving platform depicted in FIG. 3 in the vertically raised, horizontally level position.

The cargo conveyor system 10 includes a receiving platform 20, a first roller platform 22 and a second roller platform 24. The receiving platform 20 is mounted on the floor 26 of the cargo hold 12 adjacent the doorway 18. The receiving platform 20 is mounted for raising and lowering between a lower inclined position, shown in FIG. 2, and a vertically raised, horizontally level position, shown in FIG. 4. A pair of laterally oriented, spaced-apart conveyors 28 are positioned fore and aft of the receiving platform 20 on the floor 26 immediately inward of the doorway 18. The conveyors 28 are mounted at an incline in the cargo hold 12 with the lower end 30 positioned adjacent the doorway 18 and the higher end 32 located in the interior of the cargo hold 12.

When the receiving platform 20 is in the lower inclined position it will be positioned lower than the top surface of the lateral conveyors 28, as will be described more fully below, to allow cargo to be conveyed into and out of the cargo hold 12 by the lateral conveyors 28. The conveyors 28 include endless belts 34 powered for continuous movement through a common shaft 35 by an electric motor 36.

The receiving platform 20 includes a first and second set of rollers 38 and 40 formed of a plurality of individual rollers 42 having axes of rotation substantially perpendicular to the longitudinal axis of the aircraft fuselage. The rollers 42 are mounted in trays 43 that are attached to a platform frame 44 that includes end rails 46 attached at their ends to side rails 48, and a center rail 50 attached at its ends to the side rails 48. The first and second set of rollers 38 and 40 are supported at their ends by the end rails 46 and in the center by the center rail 50. Cargo placed on the receiving platform 20 is moved longitudinally fore and aft in the cargo hold by traveling over the rollers 42. Side stops 52 and 53 are mounted on each of the side rails 48. The side stops 52 and 53 consist of short vertical walls, and may be formed of L-shaped aluminum angle or other suitable material. The side stops 52 and 53 prevent lateral movement of the cargo on the rollers 42 and stabilize the load as the receiving platform 20 is raised and lowered.

Figure 3:
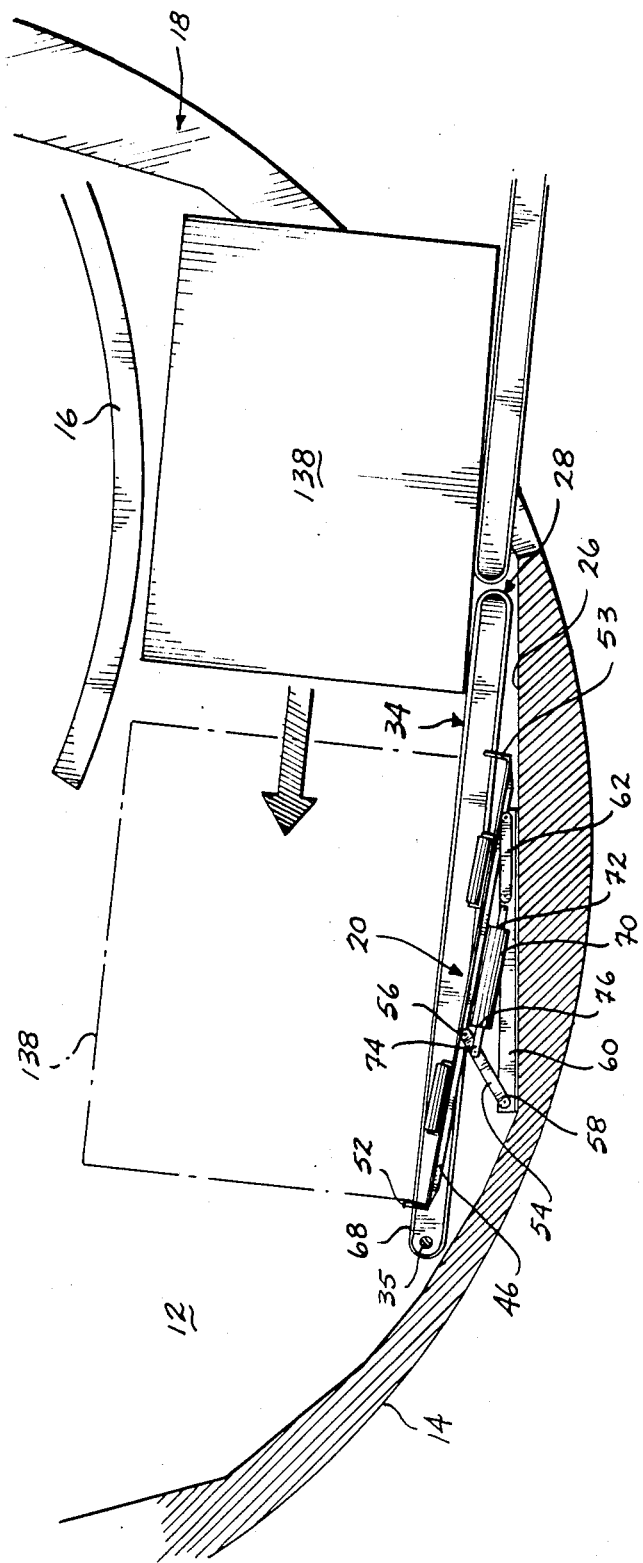
FIG. 3 is an enlarged cross-sectional view of the cargo conveying system of FIG. 2 taken along lines 3—3 showing the receiving platform in the lower inclined position.

Referring now to FIG. 3 in conjunction with FIG. 2, a pair of short links 54 are rotatably mounted at their upper ends 56 to the fore and aft end rails 46 on what will be designated as the left side of the receiving platform 20 as viewed in FIG. 2. The upper ends 56 of the short links 54 pivot about an axis parallel to the longitudinal axis of the aircraft fuselage 14. The lower ends 58 of the short links 54 are pivotally mounted to lateral floor rails 60 mounted on the floor 26 of the cargo hold 12 to pivot about an axis that is also parallel to the longitudinal axis of the aircraft fuselage 14. A pair of long links 62 are rotatably mounted at their upper ends 64 to the fore and aft end rails 46 on which will be designated the right side of the receiving platform 20 as viewed in FIG. 2. The lower ends 66 of the long links 62 are pivotally mounted to the floor rails 60 to pivot about an axis parallel to the longitudinal axis of the aircraft fuselage 14.

As is more clearly seen in FIG. 3, the axis of rotation of the long links 62 is positioned slightly lower than the axis of rotation of the short links 54. In addition, with the receiving platform 20 in the raised position, the short links 54 will be oriented substantially vertical while the long links 62 are oriented at an angle to the vertical axis such that the upper ends 56 and 64 of the links are positioned a greater distance apart than the lower ends 58 and 66 of the links. In other words, the short links 54 are pivotally offset from the long links 62. With the links so mounted, as the receiving platform 20 is moved to the right, or toward the doorway 18, the upper end 64 of the long links 62 will move in an arc closer to the floor 26 than will the upper ends 56 of the short links 54. Consequently, the right side of the receiving platform 20 will move in an arc sideways toward the door 18 and downward toward the floor 26 while the left side will remain at substantially the same or slightly lower vertical height as it also moves toward the door 18.

When the receiving platform 20 is in the fully lowered position, the long links 62 will contact the floor rails 60 and the short links 54 will remain positioned above the floor 26. In this lower inclined position, the right side stop 52 is below the top surface 68 of the endless belts 34, as shown in FIG. 3, to permit cargo to be moved into or out of the cargo hold 12 on the belts 34. The left side stop 53 is positioned above the top surface 68 of the belts 34 and acts to stop the movement of cargo when it is positioned over the receiving platform 20.

Still referring to FIGS. 2 and 3, a linear actuator 70 is preferably used to effect movement of the receiving platform 20. The linear actuator 70 has a first end 72 pivotally mounted to the floor rail 60. A rod 74 projects out of the second end 76 of the linear actuator 70 and has its projecting end 78 pivotally mounted to the center rail 50. The linear actuator 70 is preferably electrically powered, and it should have enough power to raise at a minimum a 300 lb. load in approximately one second. It is to be understood that in other applications, especially where the weight of the conveying system is not a factor, other power systems may be used, such as hydraulics, pneumatics, etc. When the linear actuator 70 is energized, the rod 74 is either extended to cause the receiving platform 20 to move inward and upward to the vertically raised, horizontally level position in the cargo hold 12, or the rod 74 is retracted to cause the receiving platform 20 to move downward toward the floor 26 and laterally sideways toward the doorway 18 to the lower inclined position.

Turning now to FIGS. 2, 5 and 6, the first roller platform 22 is formed of a first roller set 80 and a second roller set 82 each formed of a plurality of rollers 84 rotatably mounted in trays 85. The axes of rotation of the rollers 84 lie transverse to the longitudinal axis of the aircraft fuselage 14. The trays 85 are supported on and attached to a platform frame 86 having end rails 88 and side rails 90. Mounted on the side rails 90 are stops designated as a right-hand stop 92 and a left-hand stop 94. A plurality of wheels 96 are rotatably mounted to the end rails 88 for rotation about an axis parallel to the longitudinal axis of the aircraft fuselage 14. The wheels 96 support the plaform frame 86 for rolling movement in a pair of tracks 98 mounted across the cargo hold 12.

The tracks 98 are mounted at an upper horizontal level that keeps the roller platform 22 substantially coplanar with the vertically raised, horizontally level position of the receiving platform 20 to permit the transfer of cargo from the receiving platform 20 onto the first roller platform 22. The tracks 98 include a rail 100 on which the wheels 96 roll. A side wall 102 located on the outside of the rails 100 maintain the wheels 96 in alignment on the rails 100.

The second roller platform 24 includes first and second roller sets 104 and 106, a platform frame 108, and four support cranks 110. The first and second roller sets 104 and 106 are formed of a plurality of rollers 112 mounted for rotation about axes that are transverse to the longitudinal axis of the aircraft fuselage 14. The rollers 112 are supported in trays 114 that are mounted to the platform frame 108. The platform frame 108 consists of two laterally oriented support rails 116 attached underneath the trays 114 and at their ends to a left side rail 120. Mounted on top of the left side rail 120 is a left-hand stop 122. The right side of the second roller platform 24 has no stop mounted on the top thereof because, as shown in FIG. 6, the left-hand stop 94 of the first roller platform 22 will act as the right-hand stop for the second roller platform 24 when the second roller platform 24 is raised adjacent to and level with the first roller platform 22.

The second roller platform 24 is supported in the cargo hold 12 by the four support cranks 110 that are mounted in pairs to torque tubes 132 that are supported above the floor 26. Each support crank 110 has a pair of arms 124 integrally formed with and projecting from a central portion 126. The support cranks 110 are rotatably mounted at its central portion 126 on the ends of the torque tubes 132. As shown in the preferred embodiment, the arms 124 are coplanar and positioned at an obtuse angle with respect to each other. The upper arm 125 of each support crank 110 is pivotally mounted to the side of the support rails 116. The lower arms 127 of the two forwardly located support cranks 110 are pivotally coupled together by a linking rod 129 and then to an actuation rod 128. In this configuration, the second roller platform 24 moves between an intermediate horizontal level and the upper horizontal level, with the intermediate horizontal level being located between the lower inclined position of the receiving platform 20 and the upper horizontal level.

Referring to FIG. 5, the second roller platform 24 is shown at the intermediate horizontal level. At this level, the second roller platform 24 is positioned below the envelope of the first platform 22 to permit the first roller platform 22 to roll laterally (side to side) in the cargo hold 12. The second roller platform 24 is raised to the upper horizontal level by rotation of the support cranks 110 in a counterclockwise direction about the central portions 126. As the support cranks 110 rotate, the second roller platform 24 moves upward and laterally to the left side of the cargo hold 12 until it reaches the level of the first roller platform 22.

Rotation of the support cranks 110 is effected by the lateral motion of the first roller platform 22 through the coupled actuation rod 128 and a lug 130. When the first roller platform 22 is rolled on the tracks 98 to the right side of the cargo hold 12, the side rail 90 contacts the lug 130 and pushes it to the right. Movement of the lug 130 pulls the rod 128 to the right, thereby rotating the support cranks 110 and mechanically raising the second roller platform 24 to the upper horizontal level. A spring 134 has one end attached to the support crank 110 and the other end attached to the torque tube 132 or a similar location to structure on the left side of the cargo hold 12. The spring 134 returns the second roller platform 24 to the intermediate horizontal level as the first roller platform 22 moves to the left and away from the lug 130.

The operation of the cargo conveyor system 10 will now be decribed. Referring initially to FIG. 3, the receiving platform 20 is in the lower inclined position to receive cargo from the lateral conveyors 28, the second roller platform 24 is at the intermediate horizontal level and the first roller platform 22 is rolled to the left side of the fuselage to be positioned vertically above the second roller platform 24. A cargo container 138 is loaded through the doorway 18 and is received by the lateral conveyors 28. The conveyors 28 are energized to move the container 138 laterally into the cargo hold 12 until the container 138 contacts the left side stop 52 on the receiving platform 20. At this point, the conveyors 28 are stopped and the receiving platform 20 is vertically raised to the horizontally level position to be substantially coplanar with the first roller platform 22.

The cargo container 138 is then manually moved over the supporting rollers 42 of the receiving platform 20 onto the supporting rollers 84 of the first roller platform 22. The first roller platform 22 is then manually rolled along the tracks 98 to the right side of the cargo hold 12. When the side rail 90 on the first roller platform 22 contacts the lug 130, the lug 130 moves the support cranks 110 as previously described to raise the second roller platform 24 to the upper horizontal level. The receiving platform 20 is lowered to receive another cargo container that is then loaded onto the second roller platform 24. The cargo hold 12 is unloaded by reversing the above steps.

The frames of the receiving platform 20, first roller platform 22, and the second roller platform 24 may be constructed of suitable light-weight material, such as aluminum angle or the like, that is sufficiently strong to support cargo containers weighing several hundred pounds. Likewise, the rollers 42, 84 and 112 will be constructed of suitable material and sized and spaced according to the needs of the particular application, with the load of the cargo containers and the overall weight of the system to be controlling factors.

While a preferred embodiment of the invention has been illustrated and described, it will be appreciated that various changes can be made therein without departing from the spirit and scope of the invention. For instance, the combination of the receiving platform 20, the first roller platform 22 and the second roller platform 24 may be mounted at various levels within a single cargo hold to permit loading and unloading of cargo at more than two levels. In addition, powered rollers can be used to move the cargo containers longitudinally within the cargo hold. Furthermore, an electric motor with properly located actuation switches can be substituted for the lug 130 to drive the raising and lowering of the second roller platform 24. Consequently, the invention can be practiced otherwise than as specifically described herein.

The embodiments of the invention in which an exclusive property or privilege is claimed are defined as follows:

1. A cargo conveying system for loading and unloading cargo between multiple levels in the cargo hold of an aircraft fuselage, comprising:
   a first cargo support member mounted in the cargo hold of an aircraft fuselage and adapted to move laterally in the cargo hold between a first position and a second position;

a second cargo support member mounted in the cargo hold of the aircraft fuselage and adapted to move vertically between an intermediate horizontal level and an upper horizontal level laterally adjacent the first cargo support member, when the first cargo support member is moved to the second position; and platform means for raising and lowering the cargo between a lower inclined position and a vertically raised, horizontally level position that is substantially coplanar with the upper horizontal level.

2. The cargo conveying system of claim 1, further comprising a linkage means for vertically raising and lowering the second cargo support member as the first cargo support member is moved to and from the second position.

3. The cargo conveying system of claim 2, wherein said second cargo support member is positioned in vertical alignment below the first position of the first cargo support member when the second cargo support member is on the intermediate horizontal level and the first cargo support member is in the first position.

4. A cargo conveying system for loading and unloading cargo between multiple levels in the cargo hold of an aircraft fuselage having a door and a floor, the cargo conveying system comprising:

a receiving platform mounted in the cargo hold of an aircraft fuselage for receiving cargo containers conveyed through the door in the aircraft fuselage, the receiving platform having longitudinal conveyor means for moving the cargo containers longitudinally in the cargo hold and raising and lowering means for vertically raising and lowering the receiving platform from a lower inclined position to a vertically raised, horizontally level position;

a first cargo support member located at an upper horizontal level that is substantially coplanar with the vertically raised, horizontally level position of the receiving platform, the first cargo support member being mounted in the cargo hold of the aircraft fuselage for lateral movement in the cargo hold between a first position and a second position; and a second cargo support member mounted in the cargo hold of the aircraft fuselage and adapted to move vertically between an intermediate horizontal level wherein the second cargo support member is positioned vertically below the first cargo support member when said first cargo support member is in the first position, and the upper horizontal level when the first cargo support member is moved to the second position.

5. The cargo conveying system of claim 4, further comprising a linkage means for mechanically raising the second cargo support member when the first cargo support member moves to the second position and lowering the second cargo support member when the first cargo support member moves to the first position.

6. The cargo conveying means of claim 4, wherein the first cargo support member includes a plurality of rollers for supporting and moving the cargo.

7. The cargo conveying system of claim 6, wherein the second cargo support member includes a plurality of rollers for supporting and moving the cargo.

8. The cargo conveying system of claim 5, wherein the receiving platform raising and lowering means includes one or more first link members pivotally mounted to the cargo hold to pivot about a first axis and one or more second link members having a length greater than the first link members and pivotally mounted to the cargo hold to pivot about a second axis, the one or more second link members are pivotally offset from one or more first link members such that the receiving platform is coplanar with the upper horizontal level when raised and inclined with respect to the raised horizontal level when lowered.

9. The cargo conveying system of claim 8, wherein the second axis is vertically offset from the first axis.

10. The cargo conveying system of claim 8, wherein the receiving platform raising and lowering means further includes an actuation means for raising and lowering the receiving platform.

11. The cargo conveying system of claim 10, wherein the actuation means comprises a linear actuator.

* * * * *